US006968214B2

(12) United States Patent
Bumiller

(10) Patent No.: US 6,968,214 B2
(45) Date of Patent: Nov. 22, 2005

(54) PHONE NUMBER REPLACE CODE SYSTEM AND METHOD

(75) Inventor: George B. Bumiller, Ramsey, NJ (US)

(73) Assignee: Research In Motion Limited, Waterloo (CA)

( * ) Notice: Subject to any disclaimer, the term of this patent is extended or adjusted under 35 U.S.C. 154(b) by 72 days.

(21) Appl. No.: 10/787,024

(22) Filed: Feb. 25, 2004

(65) Prior Publication Data

US 2005/0186951 A1    Aug. 25, 2005

(51) Int. Cl.⁷ .............................................. H04Q 7/32
(52) U.S. Cl. .................... 455/564; 455/551; 455/550.1
(58) Field of Search ............................. 455/564, 550.1, 455/551, 432.1, 412.1–412.2, 422.1, 425, 455/403–407, 517, 456.1–456.2, 418, 221.01–221.03, 455/445, 457; 379/200.01

(56) References Cited

U.S. PATENT DOCUMENTS

| | | | | |
|---|---|---|---|---|
| 5,305,372 | A * | 4/1994 | Tomiyori | 455/564 |
| 5,454,027 | A * | 9/1995 | Kennedy et al. | 455/432.1 |
| 5,563,931 | A * | 10/1996 | Bishop et al. | 455/404.1 |
| 5,563,933 | A * | 10/1996 | August et al. | 379/114.01 |
| 5,832,072 | A * | 11/1998 | Rozenblit | 379/246 |
| 5,940,490 | A * | 8/1999 | Foster et al. | 379/221.13 |
| 6,289,226 | B1 * | 9/2001 | Lekven et al. | 455/564 |
| 6,393,292 | B1 * | 5/2002 | Lin | 455/456.5 |
| 6,556,825 | B1 * | 4/2003 | Mansfield | 455/426.1 |
| 6,751,481 | B2 * | 6/2004 | Chen et al. | 455/564 |
| 6,782,278 | B2 * | 8/2004 | Chen et al. | 455/564 |
| 6,829,337 | B2 * | 12/2004 | Misumi | 455/564 |
| 2003/0022697 | A1 | 1/2003 | Chen et al. | |
| 2003/0190037 | A1 | 10/2003 | Hruska | |
| 2004/0014454 | A1 * | 1/2004 | Burgess et al. | 455/405 |
| 2005/0058270 | A1 * | 3/2005 | Allen et al. | 379/220.01 |
| 2005/0070272 | A1 * | 3/2005 | Marangos | 455/426.2 |

FOREIGN PATENT DOCUMENTS

| | | | |
|---|---|---|---|
| EP | 04004269.9-1246 | 9/2004 | |
| JP | 11 341141 | 12/1999 | |
| JP | 11-341141 | * 12/1999 | .......... H04M 1/274 |
| WO | WO 97/03514 A1 | 1/1997 | |
| WO | WO 03/096659 A1 | 11/2003 | |

OTHER PUBLICATIONS

SINGTEL: Overseas Paid 800 Service, User Guide, How to make an Overseas Paid 800 Call, http://business.singtel.com/mnc/products/international_calling_service/overseas_paid_800_service_user_gui (Jan. 8, 2004—2 pgs).

SINGTEL: Overseas Paid 800 Service, FAQ, Frequently Asked Questions, http://business.singtel.com/mnc/products/international_calling_services/overseas_paid_800_service_faq.asp (Jan. 8, 2004-13 2 pgs).

(Continued)

*Primary Examiner*—Joseph Feild
*Assistant Examiner*—Kamran Afshar
(74) *Attorney, Agent, or Firm*—Jones Day; Krishna K. Pathiyal; Robert C. Liang

(57) ABSTRACT

A processor-implemented method of placing telephone calls includes inputting a toll-free number to initiate a phone call, determining whether the mobile device is within a North American Numbering Plan (NANP) service area, upon determining that the mobile device is within a NANP service area, initiating the phone call to the toll-free number, and upon determining that the mobile device is not within a NANP service area, replacing the Numbering Plan Area Code (NPA) of the toll-free number with a corresponding replace code to obtain a replace code toll-free number and initiating the phone call to the replace code toll-free number.

19 Claims, 9 Drawing Sheets

OTHER PUBLICATIONS

SINGTEL: Overseas Paid 800 Service, Description, http://business.singtel.com/mnc/products/international_calling_services/overseas_paid_800_service_descripti (Jan. 8, 2004—1 pg).

SINGTEL: Overseas Paid 800 Service, FAQ, Frequently Asked Questions, http://business.singtel.com/mnc/products/international_calling_services/overseas_paid_800_service_faq.asp (Jan. 9, 2004—2 pgs).

LINCMAD: LincMad Telephone Area Codes & Splits, Non-geographic Telephone Codes for North America, http://www.lincmad.com/nongeographic.html (Feb. 16, 2004—3 pgs).

Gilles, John: Global 800 Numbers Could Slash Overseas Rates, Wires News, http://www.wired.com/news/business/0,1367,2002,00.html (Feb. 17, 2004—2 pgs).

* cited by examiner

PHONE NUMBER REPLACE CODE SYSTEM AND METHOD

BACKGROUND

1. Technical Field

This patent document generally relates to a system and method of placing telephone calls, and in particular relates to the automatic implementation of replace codes.

2. Description of the Related Art

Each country determines for itself a particular numbering plan for phone numbers. A numbering plan may be common to several countries, such as the North American Numbering Plan (NANP), or may be unique to a particular country.

Many numbering plans also provide for toll-free numbers. Typically, a recipient of a call to a toll-free number pays the cost of the call for the tolls incurred within the numbering plan, but does not pay the costs for additional tolls, such as an international toll. Many callers, however, incorrectly assume that international tolls, such as tolls incurred for telephone calls placed from Europe to North America, will be covered by the recipient of the toll-free call. Thus, many toll-free numbers are not accepted by telecommunication carriers (both wire and wireless) when the toll-free number is placed from a different country of the recipient or from a different numbering plan of the recipient due to the telecommunication carriers' experience with callers refusing to pay the international portion of the call.

To resolve this problem, some numbering plans have implemented "replace codes" for the toll-free codes. In a NANP country, such as the United States, for example, the toll-free codes 800, 888, and 877 have corresponding replace codes 880, 881, and 882. When using a replace code, the caller pays the same international call charge as for a standard call to the United States. For example, if a caller in Germany attempts to place a call to a United States toll-free number 1-800-XXX-XXXX, the caller may use the replace code 880. The call to the number 1-880-XXX-XXXX is not blocked by the international carrier, and the caller pays a toll for an international call to the United States.

A caller may find it inconvenient to remember or even obtain corresponding replace codes for particular numbers. Furthermore, a caller may not even know if replace codes are available for a particular numbering plan of the country to which the caller is calling. Thus, a caller may spend a significant amount of time searching for the correct replace code for a call recipient's toll-free number or searching for the call recipient's direct dial number.

Finally, some carriers offer services to subscribers that automatically handle international calls to toll-free numbers. However, the processing to support these services are handled by the carriers, and the subscribers are typically charged a resultant processing fee or service fee.

SUMMARY

A telephone communication device operable to initiate and receive communications over one or more communication networks comprises a processing subsystem, a memory subsystem, a display subsystem, a communication subsystem, and an input/output subsystem. The processing subsystem is coupled to the memory subsystem, display subsystem, input/output subsystem and communication subsystem, and is operable to store and retrieve data in the memory subsystem, to execute instructions stored in the memory subsystem, receive input data from the input/output subsystem, and to cause the communication subsystem to transmit and receive data over the communication network. The telephone communication device has stored in memory telephone communication device program code comprising program instructions executable by the processing subsystem. Upon execution the program instructions cause the telephone communication device to receive a phone number as input and determine if the phone number corresponds to a national numbering plan of the current service area serving the telephone communication device. Upon determining that the phone number corresponds to the national numbering plan of the current service area serving the telephone communication device, the telephone communication device initiates a phone call to the phone number. Upon determining that the phone number does not correspond to the national numbering plan of the current service area serving the telephone communication device, the telephone communication device determines if the phone number has an associated replace code for any subset of the phone number, and, if so, replaces the any subset of the phone number with the corresponding replace code to obtain a replace code number and initiates a phone call to the replace code number.

A processor-implemented method of placing telephone calls from a mobile device comprises inputting a toll-free number to initiate a phone call, determining whether the mobile device is within a North American Numbering Plan (NANP) service area, upon determining that the mobile device is within a NANP service area, initiating the phone call to the toll-free number, and upon determining that the mobile device is not within a NANP service area, replacing the Numbering Plan Area Code (NPA) of the toll-free number with a corresponding replace code to obtain a replace code toll-free number and initiating the phone call to the replace code toll-free number.

DETAILED DESCRIPTION

Figure 1:
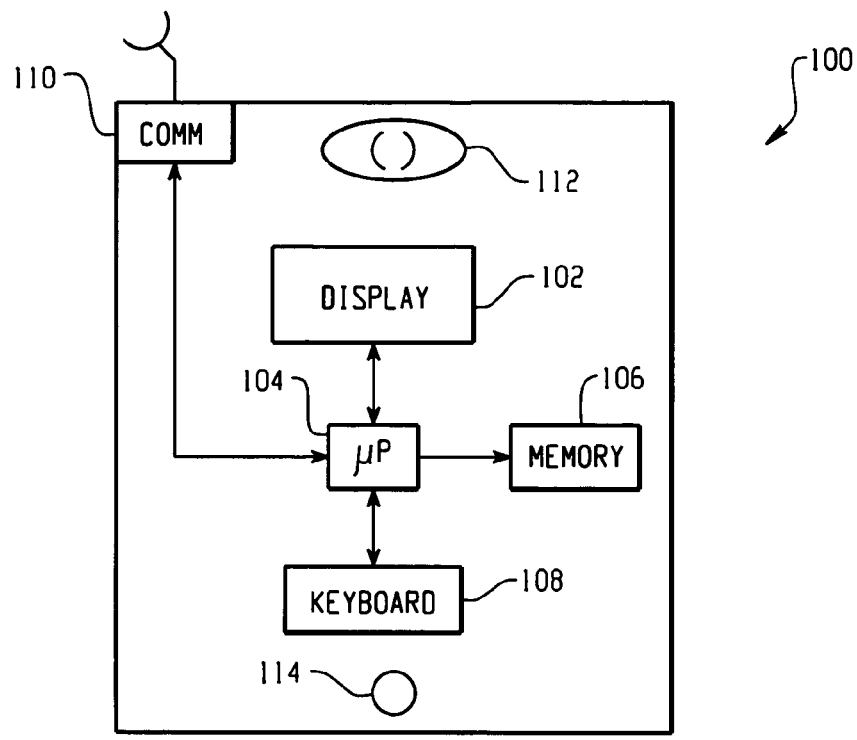
FIG. 1 is a block diagram of a mobile device.

FIG. 1 is a block diagram of a mobile device 100. The mobile device 100 may comprise a display subsystem 102, a processing subsystem 104, a memory subsystem 106, a keyboard subsystem 108, a communication subsystem 110, and an audio subsystem comprising a speaker 112 and a microphone 114. The mobile device 100 may be any mobile communication device adapted to operate within a wireless communication network and is preferably a two-way communication device. A more detailed description of the mobile device 100 and an exemplary operating environment for the mobile device 100 is described with respect to FIGS. 10 and 11 below.

Depending on the functionality provided by the mobile device 100, the mobile device 100 may be referred to as a data messaging device, a two-way pager, a cellular telephone with or without data messaging capabilities, a wireless Internet appliance or a data communication device (with or without telephony capabilities). Data communication functions, such as e-mail, instant messaging, paging, and the like, are primarily facilitated by the display subsystem 102, the keyboard subsystem 108, and the communication subsystem 110, which provide the primary user interface and communication capability for composing, reading and replying to data communications. Voice communication functions are further facilitated by the audio subsystem comprising the speaker 112 and the microphone 114.

The memory subsystem 106 stores mobile device program code comprising program instructions that are executable by the processing subsystem 104. The mobile device 100 is thus a programmable device that may be programmed to carry out multiple functions upon execution of the mobile device program code by the processing subsystem 104.

Figure 2:
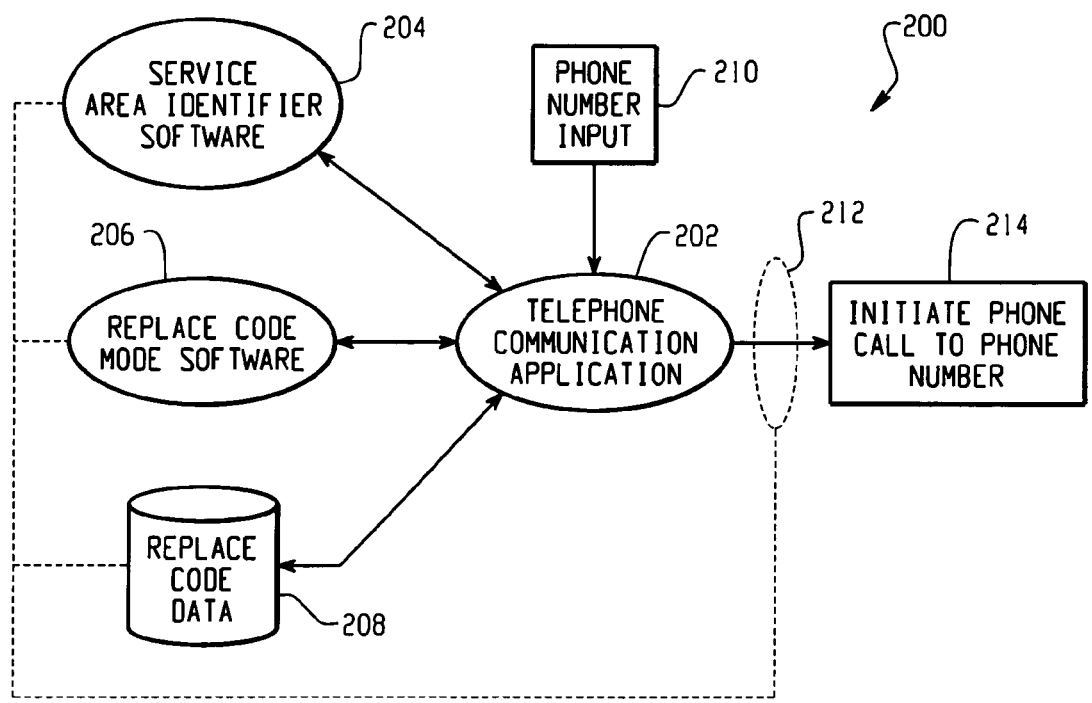
FIG. 2 is a structure block diagram of a phone number replace code system that may be implemented in the mobile device of FIG. 1, or in any other telephone communication device.

FIG. 2 is a structure block diagram of a phone number replace code system 200 that may be implemented in the mobile device 100 of FIG. 1, or in any other telephone communication device, such as a desktop phone system connected to a Public Switched Telephone Network (PSTN) system, or a mobile device operable to communication over a PSTN system. In the embodiment shown in FIG. 2, the phone number replace code system 200 comprises a telephone communication application 202, a service area identifier software 204, a replace code mode software 206, and replace code data 208.

Some national numbering plans have implemented "replace codes" for particular phone numbers, e.g., toll-free numbers. Each national numbering plan may define its own replace codes. The NANP numbering plan, for example, has designated the replace codes 880, 881, and 882 for the toll-free codes 800, 877, and 888, respectively. When using a replace code, the caller pays the same international call charge as for a standard call. The call to the number modified by the replace code is not blocked by the international carrier. Thus, when a user of the mobile device 100 is outside of the country or national numbering plan to which a phone call is to be placed, the user of the mobile device 100 may use corresponding replace codes to place the phone call.

The replace code system 200 is operable to automatically insert replace codes for a phone number depending on whether the phone number corresponds to a national numbering plan for the service area in which the mobile device 100 is operating. In general, the telephone communication application 202 is an application operative to place telephone calls in response to a phone number input 210. In the case of the mobile device 100 of FIG. 1, the telephone communication application 202 may comprise corresponding software and/or hardware that facilitates mobile device telephony functions. The service area identifier software 204 is operative to determine whether the phone number input 210 corresponds to the national numbering plan of the current service area in which the mobile device 100 is operating. If the phone number input 210 does not correspond to the national numbering plan of the current service area, then the replace code data 208 is accessed to replace a subset of the phone number input 210 with corresponding replace code numbers, as indicated by the control loop 212. Function block 214 is then called to initiate a phone call to the phone number. The phone number corresponding to function block 214 may be the phone number input 210, or the phone number as modified with a corresponding replace code number.

The service area identifier software 204 may comprise processor executable instructions stored on a processor readable medium and is operable to determine the current service area in which the mobile device 100 is operating. The service area of the mobile device 100 may be determined by a system identifier that is broadcast by the wireless network in communication with the mobile device 100. For example, in a GSM network, a Location Area Identity (LAI) is continuously transmitted over a Broadcast Control Channel (BCCH). The LAI uniquely identifies a Location Area (LA) within any Public Land Mobile Network (PLMN), and comprises a Mobile Country Code (MCC), a Mobile Network Code (MNC) and a Location Area Code (LAC). The MCC is a three digit number uniquely identifying a given country, and the MNC is either a two or three digit number used to uniquely identify a given network from within a specified country. Thus, by interrogating the LAI, the service area identifier module 204 may determine the service area in which the mobile device 100 is operating.

In another embodiment, the service area identifier software 204 may be operable to determine if the current service area in which the mobile device 100 is operating is the same service area from where wireless service for the mobile device 100 is provided. For example, in a GSM network, each mobile device 100 includes a Subscriber Identity Module (SIM). Each SIM has stored therein an International Mobile Subscriber Identity (IMSI) identifier. The IMSI is a unique identifier allocated to each mobile subscriber in a GSM network and comprises an MCC, and MNC, and a Mobile Station Identification Number (MSIN). The MCC in the IMSI corresponds to the country in which wireless service for the mobile device 100 is provided. By comparing the MCC in the IMSI to the MCC received over the BCCH, the service area identifier software 204 can determine if the current service area in which the mobile device 100 is operating is the same service area from where wireless service for the mobile device 100 is provided.

In another embodiment, the service area identifier software 204 may be operable to receive a user input comprising indicia of the service area in which the mobile device 100 is operating. For example, the user of the mobile device 100 may select from a list of countries the current country in which the mobile device 100 is operating. Alternatively, the user of the mobile device 100 may select an "Out of Home Country" or "Out of Home Numbering Plan" mode. The "Out of Home Country" mode may be selected if the user of the mobile device is away from his home country. The "Out of Home Numbering Plan" mode may be selected if the user of the mobile device is in a country that has a different national numbering plan than the numbering plan in which wireless service is provided, e.g., if the user lives in a NANP country and travels to the United Kingdom, the user may select the "Out of Home Numbering Plan" mode.

The replace code mode software 204 may comprise processor executable instructions stored on a processor readable medium and is operable to cause the mobile device 100 to automatically insert replace codes whenever a corresponding number is input, regardless of the geographic location of the mobile device 100. The replace code mode software 204 may be activated by a person who travels frequently; for example, an employee of a company may program into the mobile device 100 the company's toll-free number, and then activate the replace code mode to automatically insert the corresponding replace code for the company's toll-free number.

The replace code data 208 comprises data related to replace codes for particular national numbering plans. For example, the replace code data 208 may comprise the toll-free replace codes for NANP toll-free numbers. Additional replace codes for NANP numbers and other national numbering plans may also be stored for other such national numbering plans implementing replace codes. Accordingly, the mobile device 100 may be operable to automatically implement replace codes for a plurality of national numbering plans if such data is stored in the mobile device 100 memory. For example, if a user of the mobile device 100 places a call to the United States while in the United Kingdom, NANP replace codes, as applicable, can be used. Likewise, if the user places a call from the United States to a European country, replace codes for that European country, if designated and applicable to the number called, can be used.

The replace code data 208 may also store the particular types of national numbering plans for service areas. Defining service areas by number plans facilitates the implementation of replace codes based on the particular numbering plan of the service area rather than the particular country in which the mobile device 100 is operating. For example, the United States and Canada are NANP countries, while the United Kingdom is not. Accordingly, replace codes may not be required for a NANP toll-free number when the mobile device 100 is operating in the United States and Canada, but may be required when operating in the United Kingdom. Thus, the automatic implementation of replace codes may be activated by determining the particular numbering plan of the service area in which the mobile device 100 is operating, rather than the country.

Some calls within the same numbering plan, however, may incur additional toll charges (e.g., a call from Bermuda to Canada, both NANP countries, may incur an overseas toll charge). Accordingly, the replace code data may store additional information related to intra-numbering plan toll charges and implement replace codes according to the intra-numbering plan toll charges.

Figure 3:
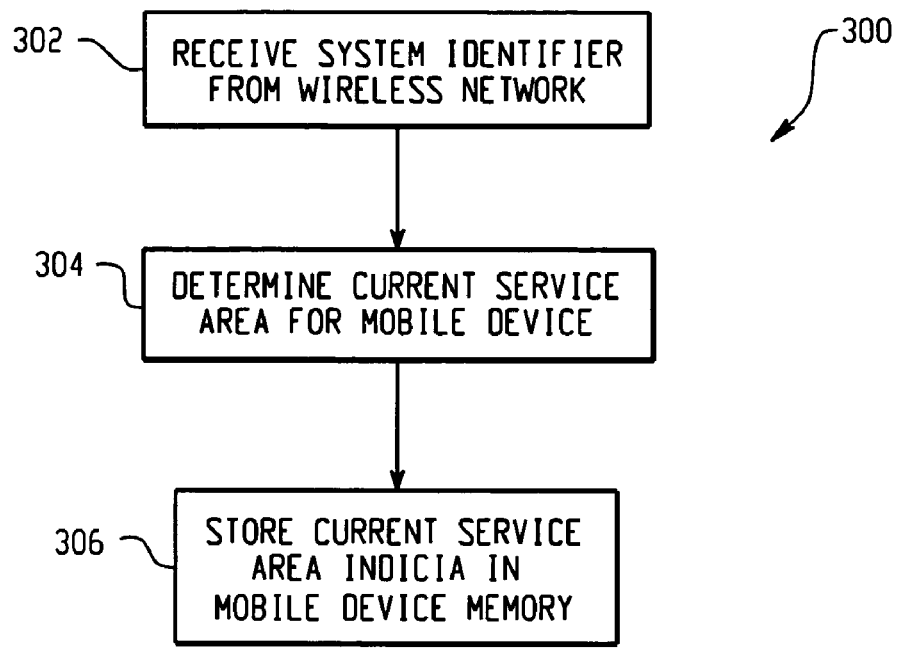
FIGS. 3 and 4 are flow diagrams for determining a current service area in which a mobile device is operating.

FIG. 3 is a flow diagram 300 for determining a current service area in which a mobile device is operating. In step 302, the mobile device receives a system identifier from the wireless network. Typically, a system identifier from a wireless network includes service area indicia, such as a MCC or MNC. In step 304, the system identifier is interrogated by the mobile device to determine the current service area in which the mobile device is operating. In step 306, the current service area indicia are stored in the mobile device memory.

Figure 4:
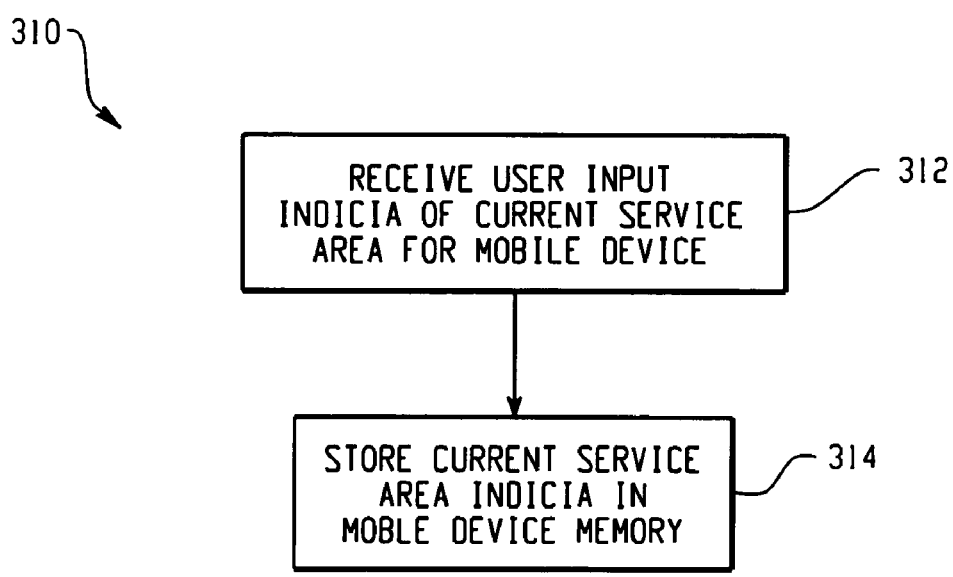
Figure 5:
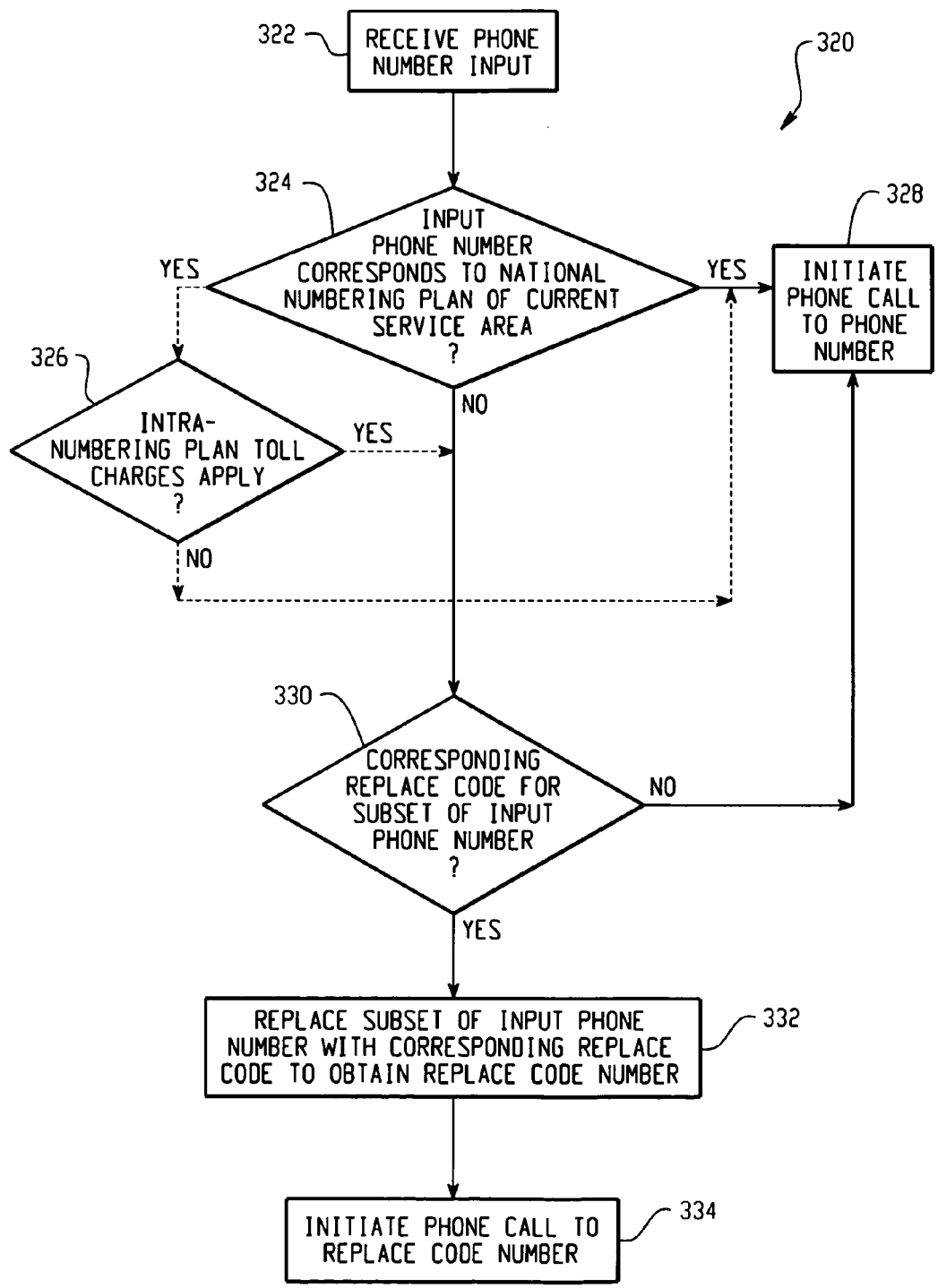
FIGS. 5–9 are flow diagrams for automatically implementing replace codes in phone numbers and initiating phone calls.

FIG. 4 is a flow diagram 310 for determining a current service area in which a mobile device is operating based on user input. This process may be implemented if the user desires to manually provide indicia of the current service area for the mobile device. In step 312, the mobile device receives user input indicia of the current service area in which the mobile device is operating. The user input indicia may specify the current service area, e.g., Germany, United Kingdom, United States, etc.

Alternatively, the user input indicia may specify that the current service area is not the home service area from which the mobile device receives wireless service, e.g., if the mobile device service provider is located in the United States, and the user will be travelling extensively in Europe, the user may elect to specify that the current service area is not the United States rather than frequently updating the mobile device during travel. The latter option of specifying that the current service area is not the home service area may be useful for the case in which the mobile device utilizes replace codes for the home service area only. For example, if the mobile device has only NANP replace codes, automatic implementation of the replaces codes may be activated by specifying that the mobile device is not operating in the home service area, e.g., not in Canada, or not in the United States, or not in a NANP country.

FIGS. 5–9 are flow diagrams for automatically implementing replace codes in phone numbers and initiating phone calls. Flow diagram 320 of FIG. 5 implements replace codes based on the national numbering plan of the current service area. In step 322, the mobile device receives a phone number as input. The phone number input may be received by the user manually entering the phone number, or by selecting a contact in an address book, and the like.

Step 324 determines if the phone number corresponds to the national numbering plan of the current service area. The determination may be made comparing the numbering plan of the current service area to the numbering plan to which the phone number corresponds, or may be made by comparing the country of the current service area to the country to which the phone number corresponds. For example, the country code of the phone number may be interrogated to determine the country or national numbering plan to which the phone number corresponds.

Additionally, if the determination is made based on the national numbering plans of the current service area and the service area to which the phone number corresponds, and these national numbering plans are the same, then the replace code data 208 may be interrogated to determine if any intra-numbering plan toll charges apply, as shown in optional step 326.

If the phone number corresponds to the national numbering plan of the current service area, and no intra-numbering plan toll charges apply, then the mobile device may initiate the phone call to the phone number as input, as shown in step 328.

If the phone number does not correspond to the national numbering plan of the current service area, or intra-numbering plan toll charges apply, then step 330 determines if the phone number has a corresponding replace code for a subset of the phone number. If the phone number does not have a corresponding replace code for a subset of the phone number, e.g., the phone number is a direct dial to a non-toll-free number, then the mobile device may initiate the phone call to the phone number as input, as shown in step 328.

If the phone number does have a corresponding replace code for a subset of the phone number, then in step 332 the subset of the input phone number is replaced with the corresponding replace code to obtain a replace code number. In step 334, the mobile device initiates a phone call to the replace code phone number.

Figure 6:
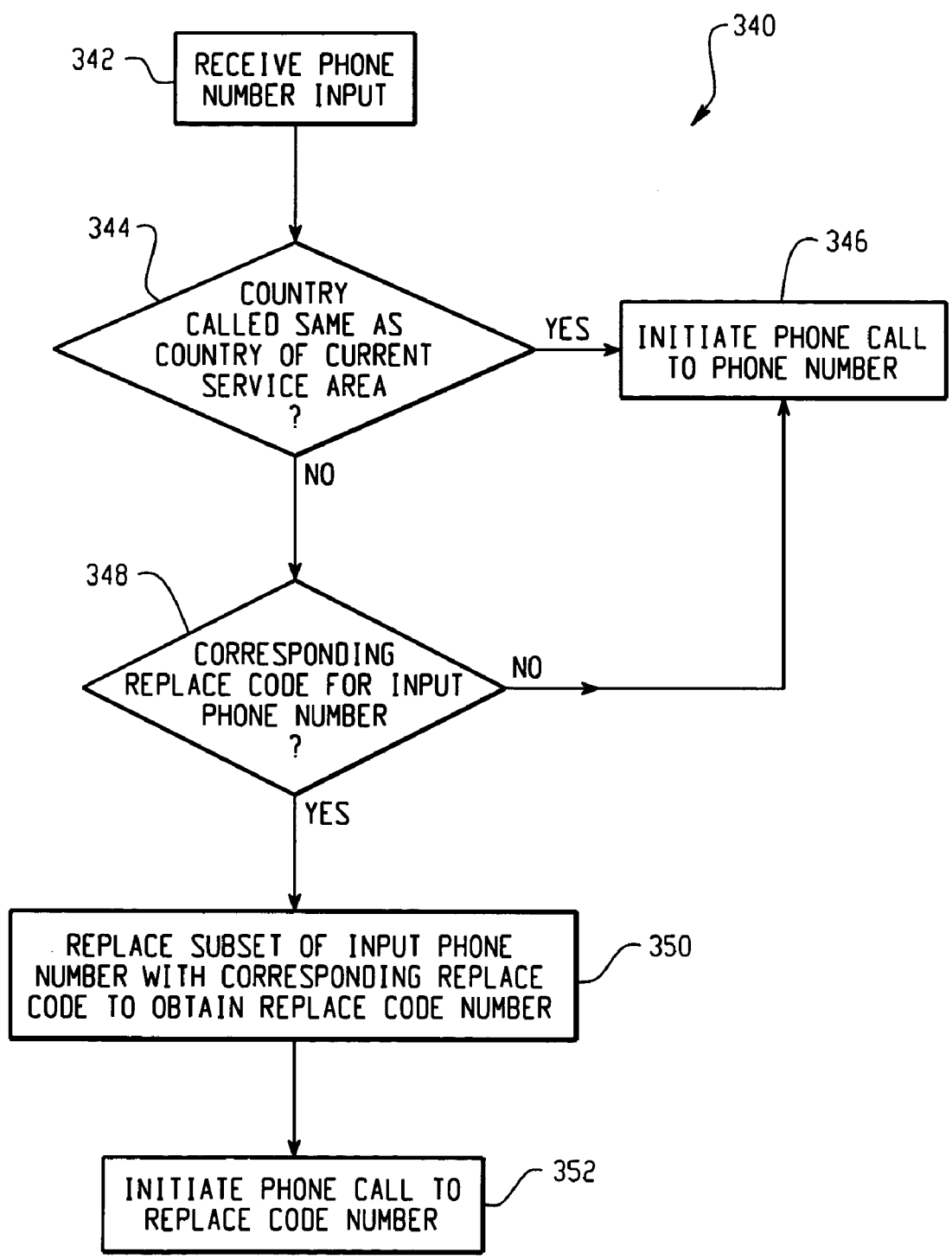

Flow diagram 340 of FIG. 6 implements replace codes based on the country of the current service area. In step 342, the mobile device receives a phone number input. The phone number input may be received by the user manually entering the phone number, or by selecting a contact in an address book, and the like.

Step 344 determines if the country called is the same as the country of the current service area. The determination may be made comparing the country of the current service area to the country to which the phone number corresponds. For example, the country code of the phone number may be interrogated to determine the country called, and the country called may be compared to the country identified by the wireless network currently providing service to the mobile device. Alternatively, the country called may be compared to a country that the user has manually specified as the current service area of the mobile device.

If the country called is the same as the country of the current service area, then the mobile device may initiate the phone call to the phone number as input, as shown in step 346. If the country called is not the same as the country of the current service area, then step 348 determines if the phone number has a corresponding replace code for a subset of the phone number. If the phone number does not have a corresponding replace code for a subset of the phone number, e.g., the phone number is a direct dial to a non-toll-free number, then the mobile device may initiate the phone call to the input phone number, as shown in step 346.

If the phone number does have a corresponding replace code for a subset of the phone number, then in step 350 the subset of the input phone number is replaced with the corresponding replace code to obtain a replace code number. In step 352, the mobile device initiates a phone call to the replace code phone number.

Figure 7:
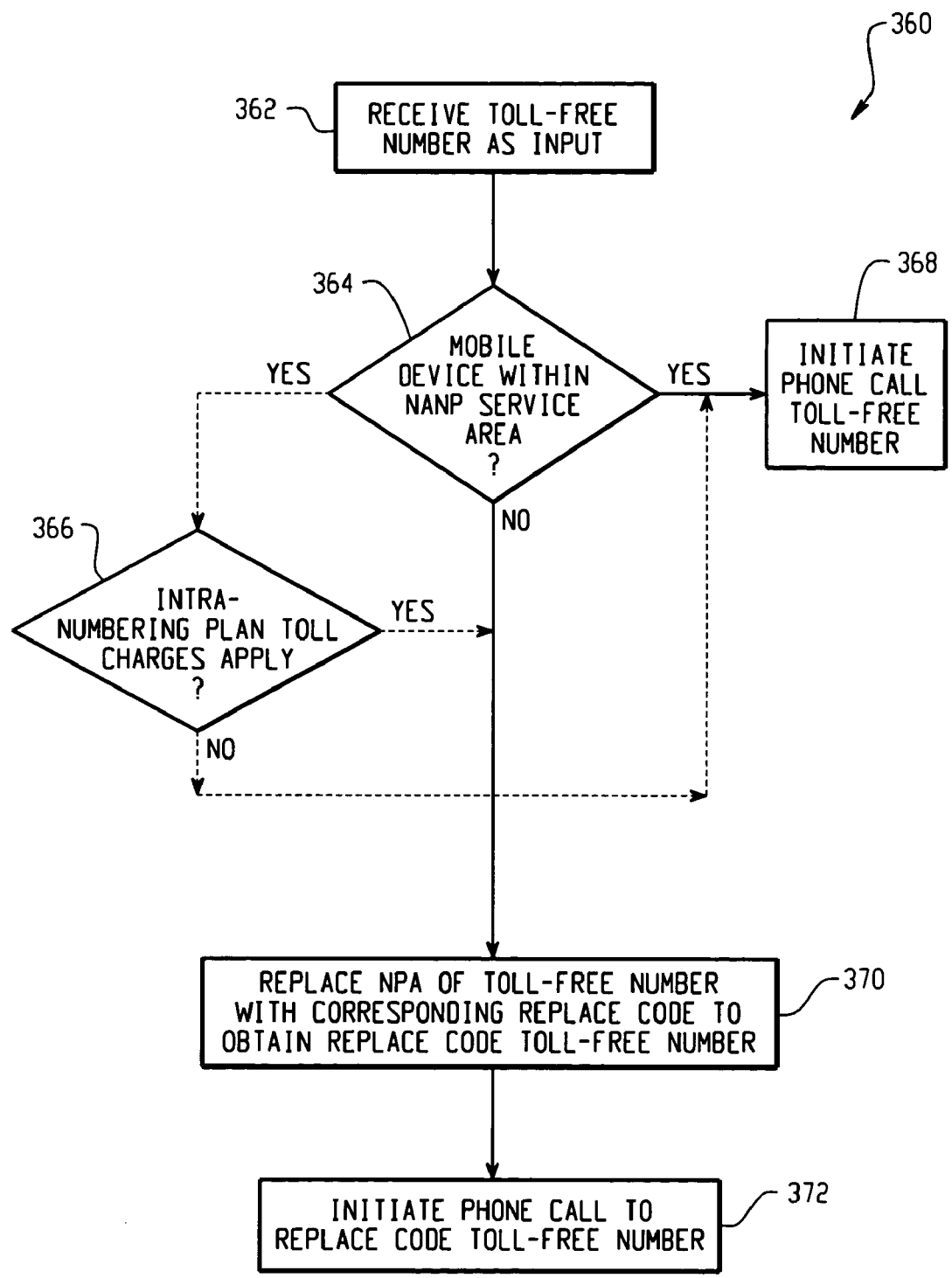

Flow diagram 360 of FIG. 7 implements replace codes for toll-free numbers based on a NANP service area. In step 362, the mobile device receives a NANP toll-free phone number as input. The phone number may be received by the user manually entering the phone number, or by selecting a contact in an address book, and the like.

Step 364 determines if the mobile device is within a NANP service area. The determination may be made by comparing the country of the current service area to a list of NANP countries or by a user-specified input. If it is determined that the mobile device is within a NANP service area, then the replace code data 208 may optionally be interrogated to determine if any intra-numbering plan toll charges apply, as shown in optional step 366.

If the mobile device is within a NANP service area, and no intra-numbering plan toll charges apply, then the mobile device may initiate the phone call to the phone number as input, as shown in step 368.

If the mobile device is not within a NANP service area, or if intra-number plan toll charges apply, then step 370 replaces a subset of the phone number with the corresponding replace code to obtain a replace code number. In step 372, the mobile device initiates a phone call to the replace code phone number.

Figure 8:
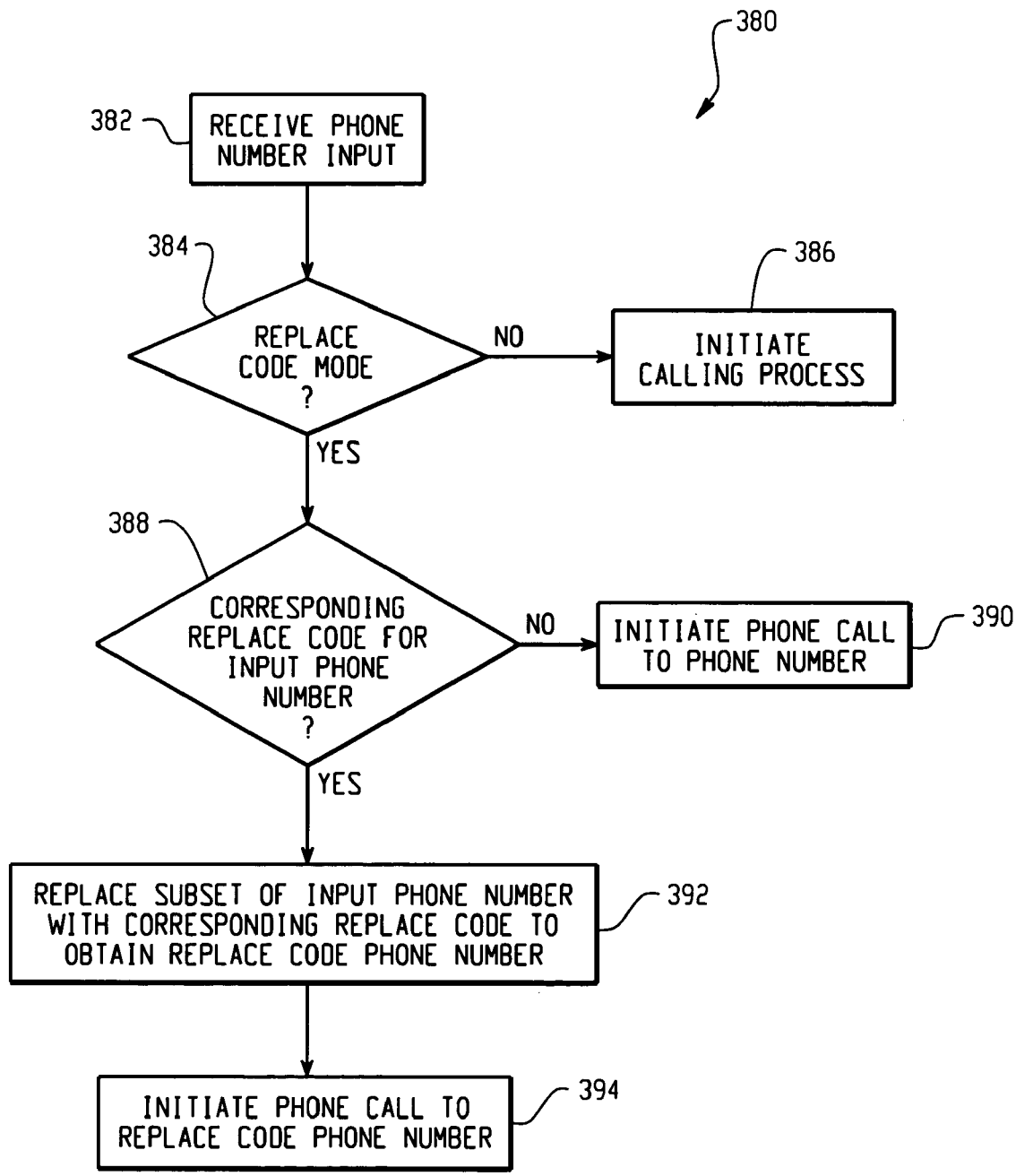

Flow diagram 380 of FIG. 8 implements replace codes based on a replace code mode. In step 382, the mobile device receives a phone number as input. The phone number may be received by the user manually entering the phone number, or by selecting a contact in an address book, and the like.

Step 384 determines if the mobile device is in a replace code mode. The replace code mode may be activated by a user of the mobile device. Alternatively, the replace code mode may be activated automatically when the mobile device determines that it is operating in a different country than the home country of the mobile device, or by similar decision processes.

If the replace code mode is not activated, then the mobile device may initiate the phone call to the phone number as input, as shown in step 386. If the replace code mode is activated, however, then step 388 determines if the phone number has a corresponding replace code for a subset of the phone number. If the phone number does not have a corresponding replace code for a subset of the phone number, then the mobile device may initiate the phone call to the phone number, as shown in step 390.

If the phone number does have a corresponding replace code for a subset of the phone number, however, then in step 392 the subset of the phone number is replaced with the corresponding replace code to obtain a replace code number. In step 394, the mobile device initiates a phone call to the replace code phone number.

Figure 9:
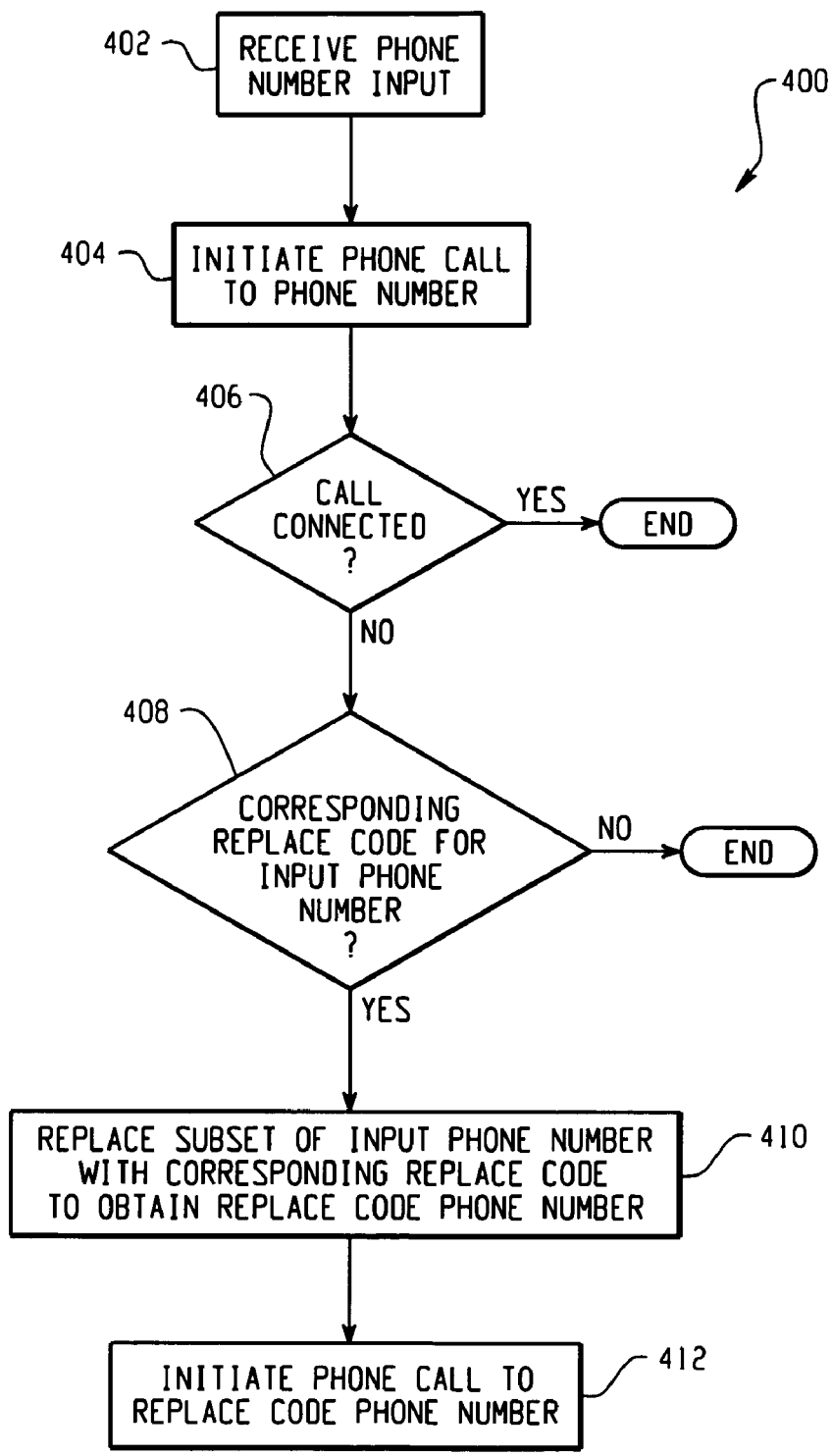

Flow diagram 400 of FIG. 9 implements replace codes based on call connections. In step 402, the mobile device receives a phone number as input. The phone number may be received by the user manually entering the phone number, or by selecting a contact in an address book, and the like.

Step 404 initiates a phone call to the phone number, and step 406 determines if the phone call is connected. The determination may be made automatically, such as by monitoring for the connection, or by a user input, such as by the user selecting a key if the call is not connected.

If the phone call is connected, the process ends. If the phone call is not connected, however, then step 408 determines if the phone number has a corresponding replace code for a subset of the phone number. If the phone number does not have a corresponding replace code for a subset of the phone number, then the process ends.

If the phone number does have a corresponding replace code for a subset of the phone number, however, then in step 410 the subset of the phone number is replaced with the corresponding replace code to obtain a replace code number. In step 412, the mobile device initiates a phone call to the replace code phone number.

Figure 10:
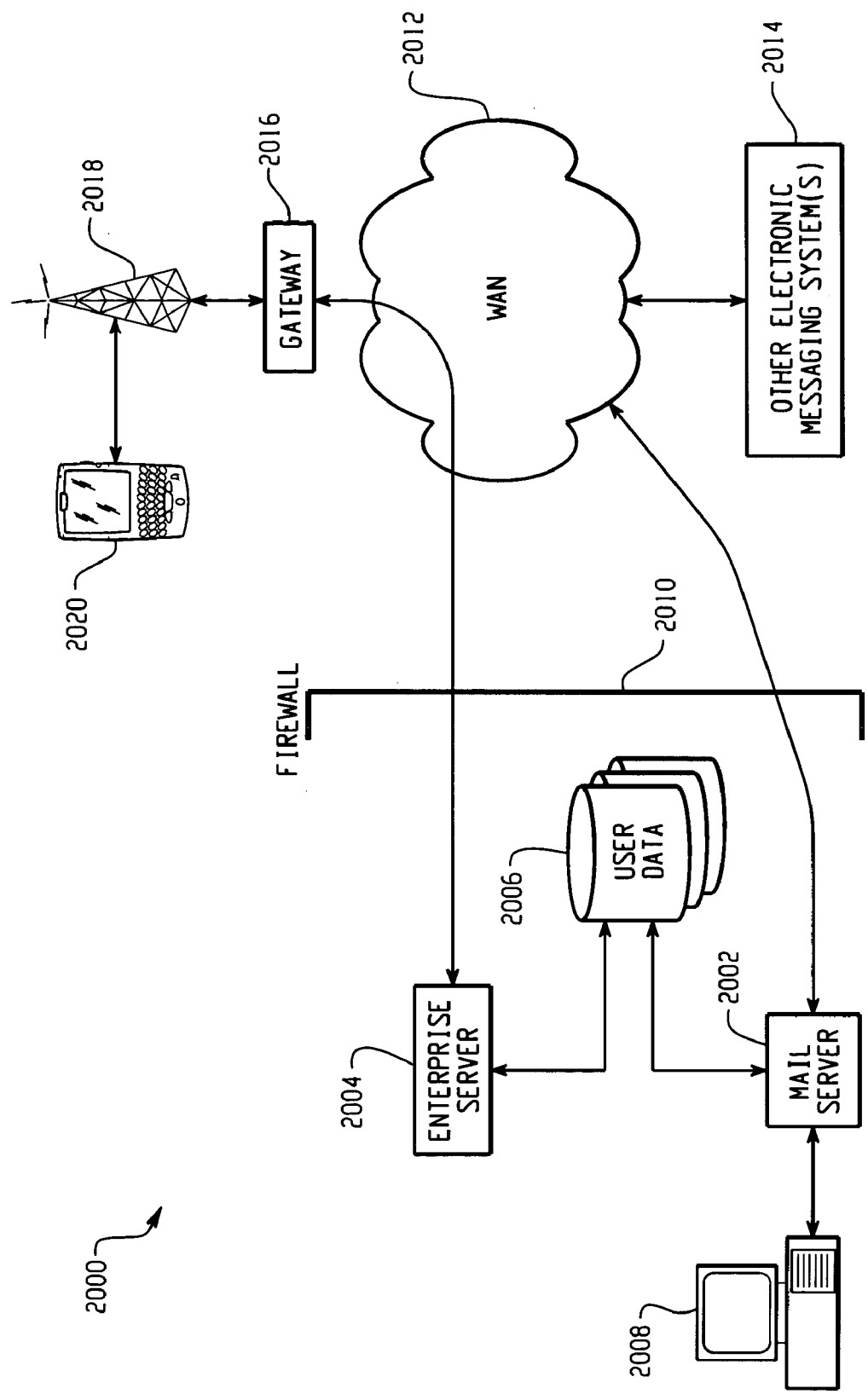
FIG. 10 is a block diagram of an example system for redirecting electronic messages to and from the mobile device of FIG. 1.

The mobile device 100 of FIG. 1 may be used in a number of wireless systems, such as the example system 2000 of FIG. 10. The example redirector system 2000 of FIG. 10 redirects electronic messages to and from a mobile communication device 2020. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that executes electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic messages addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packet(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, and 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 11:
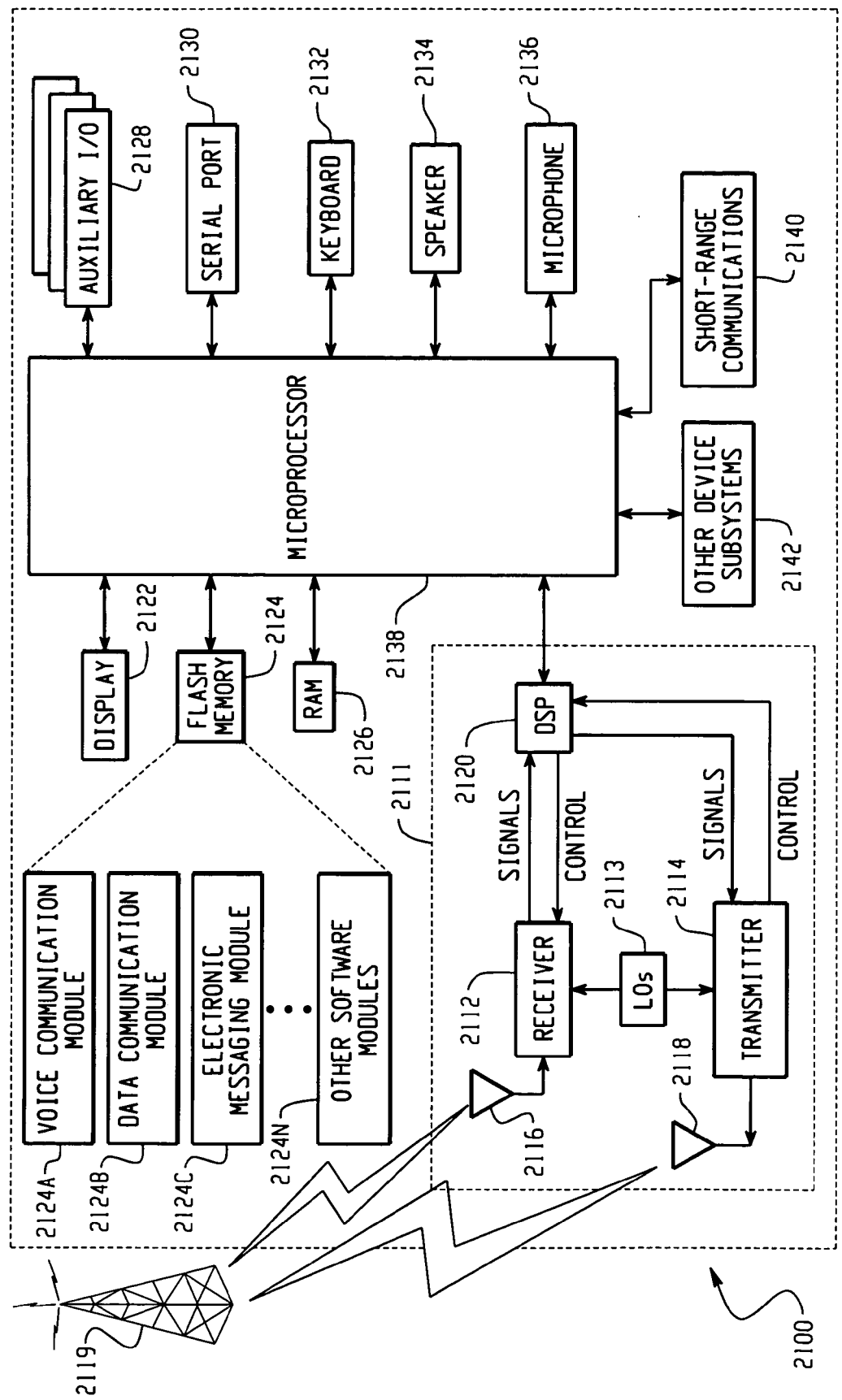
FIG. 11 is a more detailed block diagram of the mobile device of FIG. 1.

FIG. 11 is a block diagram illustrating an example mobile communication device 2100. The block diagram for the example mobile communication device 2100 can be considered a more detailed block diagram of the mobile device 100 of FIG. 1. The mobile device 2100 includes a processing subsystem 2138, a communications subsystem 2111, a short-range communications subsystem 2140, and a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture, or subsequent to manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device or with the subscription that the user has been provided. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, flow diagrams, and structure block diagrams described in this patent document may be implemented in the mobile devices described herein by mobile device program code comprising program instructions that are executable by the mobile device processing subsystem. Other implementations may also be used, however, such as firmware or even appropriately designed hardware configured to carry out the methods and flow diagrams described in this patent document. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Many types of mobile devices may use the systems and methods described herein, including GSM devices, CDMA devices, iDEN devices, TDMA devices, analog devices, WCDMA devices, or other wireless devices. The systems and methods described herein may be used to facilitate voice and/or data calls. The mobile device may also use wired communications. Furthermore, the apparatus and methods described in this patent document may be implemented in other computing devices, such as a desktop phone, laptop computer with telephony capabilities, a desktop computer with telephony capabilities, or any other electronic device operable to communication over one or more wired and/or wireless telephone networks.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A mobile device operable to initiate and receive communications over one or more communication networks, the mobile device comprising:

a processing subsystem, a memory subsystem, a display subsystem, a communication subsystem, and an input/output subsystem, the processing subsystem coupled to the memory subsystem, display subsystem, input/output subsystem and communication subsystem, and operable to store and retrieve data in the memory subsystem, to execute instructions stored in the memory subsystem, receive input data from the input/output subsystem, and to cause the communication subsystem to transmit and receive data over the communication network; and mobile device program code comprising program instructions executable by the processing subsystem and stored in the memory subsystem and upon such execution cause the mobile device to:

receive a toll-free number as input to initiate a phone call;
determine whether the mobile device is within a North American Numbering Plan (NANP) service area;
upon determining that the mobile device is within a NANP service area, initiate the phone call to the toll-free number; and
upon determining that the mobile device is not within a NANP service area, replace the Numbering Plan Area Code (NPA) of the toll-free number with a corresponding replace code to obtain a replace code toll-free number and initiate the phone call to the replace code toll-free number.

2. The mobile device of claim 1, wherein the program instructions executable by the mobile device that cause the mobile device to determine whether the mobile device is within a NANP service area comprise program instructions that upon execution cause the mobile device to make the determination based on a country code.

3. The mobile device of claim 2, wherein the country code is received from a wireless network in communication with the mobile device.

4. The mobile device of claim 2, wherein the country code is received from a user input.

5. The mobile device of claim 1, wherein the program instructions executable by the mobile device that cause the mobile device to initiate the phone call to the toll-free number upon determining that the mobile device is within a NANP service area comprise program instructions that upon execution cause the mobile device to:
determine if intra-numbering plan toll charges apply to the phone call; and
upon determining that intra-numbering plan toll charges apply to the phone call, replace the NPA of the toll-free number with a corresponding replace code to obtain a replace code toll-free number and initiate the phone call to the replace code toll-free number.

6. The mobile device of claim 1, wherein the mobile device is a GSM device.

7. The mobile device of claim 1, wherein the program instructions executable by the mobile device that cause the mobile device to determine whether the mobile device is within a NANP service area comprise program instructions that upon execution cause the mobile device to operate in replace code mode and upon such operation automatically replace the NPA of the toll-free number with a corresponding replace code.

8. A mobile telephone communication device operable to initiate and receive communications over one or more communication networks, the mobile telephone communication device comprising:
a processing subsystem, a memory subsystem, a display subsystem, a communication subsystem, and an input/output subsystem, the processing subsystem coupled to the memory subsystem, display subsystem, input/output subsystem and communication subsystem, and operable to store and retrieve data in the memory subsystem, to execute instructions stored in the memory subsystem, receive input data from the input/output subsystem, and to cause the communication subsystem to transmit and receive data over the communication network; and
mobile telephone communication device program code comprising program instructions executable by the processing subsystem and stored in the memory subsystem and upon execution cause the mobile telephone communication device to:
receive a phone number as input to initiate a phone call;
determine if the phone number corresponds to a national numbering plan of the current service area serving the mobile telephone communication device;
upon determining that the phone number corresponds to the national numbering plan of the current service area serving the mobile telephone communication device, initiate a phone call to the phone number;
upon determining that the phone number does not correspond to the national numbering plan of the current service area serving the mobile telephone communication device, determine if the phone number has an associated replace code for any subset of the phone number; and
upon determining that the phone number has an associated replace code for any subset of the phone number, replace the any subset of the phone number with the corresponding replace code to obtain a replace code number and initiate a phone call to the replace code number.

9. The mobile telephone communication device of claim 8, wherein the program instructions executable by the mobile telephone communication device that cause the mobile telephone communication device to determine if the phone number corresponds to a national numbering plan of the current service area serving the mobile telephone communication device comprise program instructions that upon execution cause the mobile telephone communication to make the determination based on a country code.

10. The mobile telephone communication device of claim 9, wherein the country code is received from a user input.

11. The mobile telephone communication device of claim 9, wherein the mobile telephone communication device is a mobile device, and wherein the country code is received from a wireless network in communication with the mobile device.

12. The mobile telephone communication device of claim 8, wherein the program instructions executable by the mobile telephone communication device that cause the mobile telephone communication device to determine if the phone number corresponds to a national numbering plan of the current service area serving the mobile telephone communication device comprise program instructions that upon execution cause the mobile telephone communication device to operate in a replace code mode and upon such operation automatically determine if the phone number has an associated replace code for any subset of the phone number and upon determining that the phone number has an associated replace code for any subset of the phone number, replace the any subset of the phone number with the corresponding replace code to obtain a replace code number and initiate a phone call to the replace code number.

13. The mobile telephone communication device of claim 8, wherein the program instructions executable by the mobile telephone communication device that cause the mobile telephone communication device to determine if the phone number has an associated replace code for any subset of the phone number comprise program instructions that upon execution cause the mobile telephone communication device to:
determine the national numbering plan to which the phone number corresponds;
identify replace codes corresponding to the national numbering plan to which the phone number corresponds; and make the determination of whether the phone number has an associated replace code for any subset of the phone number based on identified replace codes.

14. The mobile telephone communication device of claim 8, comprising further mobile telephone communication device program code comprising program instructions executable by the processing subsystem and stored in the memory subsystem and upon execution cause the mobile telephone communication device to:
  determine if the phone call initiated to the phone number connected;
  upon determining that the phone call initiated to the phone number did not connect, determine if the phone number has an associated replace code for any subset of the phone number; and
  upon determining that the phone number has an associated replace code for any subset of the phone number, replace the any subset of the phone number with the corresponding replace code to obtain a replace code number and initiate a phone call to the replace code number.

15. The mobile telephone communication device of claim 14, wherein the determination is made based on a user input.

16. A processor-implemented method of placing a telephone call to a toll-free number from a mobile device, comprising:
  determining whether the mobile device is within a North American Numbering Plan (NANP) service area;
  upon determining that the mobile device is within a NANP service area, initiating the phone call to the toll-free number; and
  upon determining that the mobile device is not within a NANP service area, replacing the Numbering Plan Area Code (NPA) of the toll-free number with a corresponding replace code to obtain a replace code toll-free number, and initiating the phone call to the replace code toll-free number,
  wherein initiating the phone call to the toll-free number upon determining that the mobile device is within a NANP service area comprises:
  determining if intra-numbering plan toll charges apply to the phone call; and
  upon determining that intra-numberina elan toll charges apply to the phone call, replacing the NPA of the toll-free number with a corresponding replace code to obtain a replace code toll-free number and initiating the Phone call to the replace code toll-free number.

17. The method of claim 16, wherein determining whether the mobile device is within a North American Numbering Plan (NANP) service area is based on a country code.

18. The method of claim 17, wherein the country code is received from a wireless network.

19. A processor-implemented method of placing a telephone call to a phone number, from a mobile telecommunication device, comprising:
  determining whether the phone number requires modification by an associated replace code;
  upon determining that the phone number does not require modification by an associated replace code, placing a call from the mobile telecommunication device to the phone number; and
  upon determining that the phone number requires modification by an associated replace code, modifying the phone number by the replace code to obtain a replace code number and placing a call from the mobile telecommunication device to the replace code number;
  wherein determining if the phone number requires modification by an associated replace code comprises:
  determining whether the country called is the same as the country in which the mobile telecommunication device is operating;
  determining that the phone number does not require modification by an associated replace code if the country called is the same as the country in which the mobile telecommunication device is operating; and
  determining that the phone number does require modification by an associated replace code if the country called is not the same as the country in which the mobile telecommunication device is operating;
  wherein determining if the phone number requires modification by an associated replace code comprises:
  determining whether the mobile telecommunication device is operating in a replace code mode;
  determining that the shone number does not require modification by an associated replace code if the mobile telecommunication device is not operating in a replace code mode; and
  determining that the phone number does require modification by an associated replace code if the mobile telecommunication device is operating in a replace code mode.

* * * * *

UNITED STATES PATENT AND TRADEMARK OFFICE
CERTIFICATE OF CORRECTION

PATENT NO. : 6,968,214 B2 Page 1 of 1
APPLICATION NO. : 10/787024
DATED : November 22, 2005
INVENTOR(S) : Bumiller It is certified that error appears in the above-identified patent and that said Letters Patent is hereby corrected as shown below:

Column 14,
Line 34, delete "wherein the mobile telephone communication device is a mobile device, and".

Column 15,
Line 23, insert -- of if the phone call initiated to the phone number connected -- between "determination" and "is made based on a user input.".
Line 37, replace "," with -- ; -- after "toll-free number".
Line 43, replace "intra-numberina elan" with -- intra-numbering plan --.
Line 47, replace "Phone call" with -- phone call --.

Column 16,
Line 34, insert -- the -- between "wherein" and "determining".
Line 35, insert -- further -- between "code" and "comprises".
Line 38, replace "shone" with -- phone --.

Signed and Sealed this

Twentieth Day of June, 2006

JON W. DUDAS
*Director of the United States Patent and Trademark Office*